A. B. ELY.
Telegraph-Wire Insulator.
No. 53,426. Patented March 27, 1866.
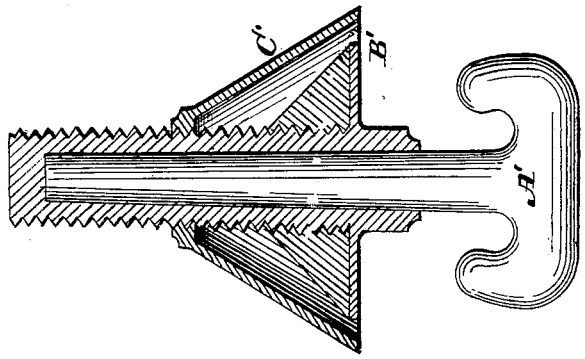
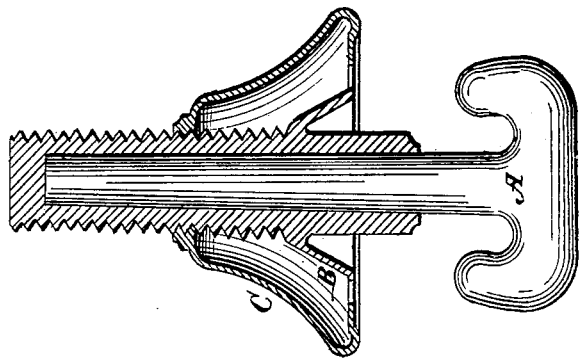
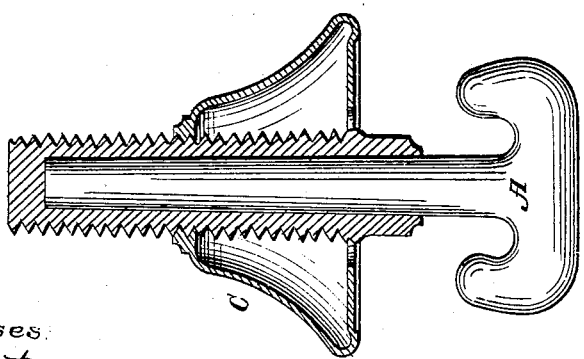

UNITED STATES PATENT OFFICE.

ALFRED B. ELY, OF NEWTON, MASSACHUSETTS.

IMPROVEMENT IN TELEGRAPH-INSULATORS.

Specification forming part of Letters Patent No. 53,426, dated March 27, 1866.

*To all whom it may concern:*

Be it known that I, ALFRED B. ELY, of Newton, in the State of Massachusetts, have invented a new and useful Pin-Hook Insulator for Supporting Telegraphic Wires; and the following is a clear and exact description of the same.

Metallic pin-hooks with their shanks covered with rubber, and also pin-hooks with a plain hollow rubber cone at the lower part of the shank, have been used for suspending telegraph-wires; but both these kinds have been found insufficient for insulating purposes in wet weather.

I have heretofore invented and patented, in connection with and attached to a rubber-covered pin-hook, a rubber (or equivalent) hollow bell-chamber, the mouth of which is turned inward by a lip, flange, diaphragm, or otherwise, so as to surround and approach but not touch the shank. As no moisture can cross the insulating chasm thus intervened between the wire and the support to which the pin is attached, this forms a perfect insulator in wet weather.

Of one of the forms of this invention, attached to the two kinds of pin-hooks first above mentioned, I give illustrations in Drawings No. 1 and No. 2.

A is the pin-hook, covered with rubber. B is the rubber cone, and C is my rubber bell-chamber.

Drawing No. 2 essentially embraces the features of the invention for which I now apply for a patent, and which may be called a modification of my former invention; but for greater certainty I make this new application for such modification, which consists in attaching to a plain rubber-covered pin-hook a projecting rubber disk or rim of any proper shape, at the lower part of the shank, and an open-mouthed bell or box above it on the shank and projecting down over the rim or disk, leaving a small space all around between the edges of the disk and the sides of the bell or box, thus making a bell-chamber upon and in connection with the pin-hook, differing somewhat from the one described in my former specification, as appears by Drawing No. 3, in which A' is the pin-hook, B' the projecting disk, and C' the projecting-bell, both bell and disk being a part of or tightly attached to the shank of the pin-hook. These are to be made of rubber or some equivalent substance which will not gather moisture and is a non-conductor of electricity.

It was my intention to cover this in my former application; but to avoid any question I make this additional application, adding, by way of further explanation, that the disk may be made in the shape of a solid cone, as appears by the dotted portion in red, Drawing No. 3, or otherwise, as may be found convenient in the manufacture of the article.

Claiming, therefore, the rubber bell-chamber, with the diaphragm attached to the bottom of the bell and encircling the shank without touching it, in combination with the pin-hook, as heretofore and formerly described, I now claim as my invention—

1. The rubber bell and disk attached to the shank, in combination with the pin-hook, when constructed and arranged substantially as described.

2. As articles of manufacture, the rubber bell-chambered pin-hooks, as described.

ALFRED B. ELY.

Witnesses:
W. M. PARKER,
A. G. TREADWELL.